United States Patent Office 3,302,999
Patented Feb. 7, 1967

3,302,999
CARBON FOAM
Charles V. Mitchell, Shaker Heights, Ohio, assignor to Union Carbide Corporation, a corporation of New York
No Drawing. Filed Nov. 14, 1962, Ser. No. 238,825
6 Claims. (Cl. 23—209.2)

This invention relates to foamed articles. More particularly, this invention relates to porous carbon articles and methods for making the same.

Porous carbon bodies such as coke and various charcoals are widely used in industrial applications such as filter beds, catalyst supports, diffusers, aerators, gas absorbers, scrubbers, and the like. Such carbon bodies are produced by the destructive distillation of naturally occurring carbonaceous materials since all such materials give up a substantial amount of their volatile matter when heated in an atmosphere having a limited amount of oxygen, for example, in a closed retort. The residue after distillation is coke or charcoal. Commonly produced are charcoals of wood, bone, leather, rice hulls, and the like.

When such carbonaceous materials are distilled the resulting product substantially retains the carbon skeleton of the material from which the volatile constituents have been driven off with or without decomposition. Charcoals of wood, bone, ivory, etc. all retain, in miniature, the grain and structure of the parent material.

Porous carbon bodies produced in the aforedescribed manner have serious shortcomings, however. Such bodies have quite erratic and unpredictable physical properties, are readily ignited at relatively low temperatures, and continue to burn once ignited. Other such bodies have a relatively high bulk density and are poor thermal insulants.

It is an object of the present invention to provide a structurally different carbon article which overcomes the above-mentioned shortcomings and methods for making said article.

It is another object to provide a foamed carbon article possessing excellent flame-retarding properties.

It is a further object to provide a foamed carbon article having good thermal insulating properties.

It is a still further object to provide a foamed carbon article having a relatively low electrical conductivity.

Other objects will become readily apparent to one skilled in the art upon reference to the ensuing discussion and the appended claims.

The foregoing objects are achieved by a synthetic carbon foam article having its carbon atoms arranged in a lattice substantially similar to that of carbon atoms in a rigid polyester-type polyurethane foam from which said carbon foam is prepared by thermal processing. The processing will be fully discussed hereinbelow.

The bulk density of the carbon foam can be as low as about 0.03 g./cc. and as high as 0.45 g./cc. depending on the density of the rigid polyurethane foam starting material. The greater the density of the starting material, the greater will be the density of the final product.

The physical characteristics of the carbon foam are functions of its bulk density and also are dependent on whether the carbon is present in a crystalline or amorphous form. Table I below is a compilation of typical physical properties for carbon foam samples prepared according to the teachings of the present invention. Table II is a compilation of physical properties of natural wood charcoals included herein for purpose of comparison.

TABLE I.—PHYSICAL PROPERTIES OF CARBON FOAM

A. PYROLYZED AT ABOUT 900° C.

| Bulk Density, grams/cc. | Helium Real Density, g./cc. | Ash Content, weight percent | Thermal Conductivity, B.t.u./ft.² hr. (° F./ft.) | Resistivity, ohm-cm. at 25° C. | Surface Area, m.²/g. | Coeff. of Thermal Expansion, ×10⁷/° C. | Compressive Strength, p.s.i. |
|---|---|---|---|---|---|---|---|
| 0.085–0.095 | 2.065 | 0.498 | [1] 0.50 | [1] 0.97–1.24 | 11 | [2] 45.1 (28°–385° C.) | [1] 130 |
| 0.162–0.199 | 2.009 | 0.300 | [1] 1.36 | [1] 0.46–0.83 | 31 | [1] 36.4 (23°–618° C.) | [1] 465 |
| 0.314–0.387 | 2.004 | 0.213 | [1] 1.89 | [2] 0.82–0.96 | 11 |  | [2] 390 |
|  |  |  |  |  |  |  | [1] 2,225 |
|  |  |  |  |  |  |  | [2] 2,040 |

B. PYROLYZED AT ABOUT 900° C. AND THEREAFTER GRAPHITIZED AT 2,900° C.

| Bulk Density, grams/cc. | Helium Real Density, g./cc. | Ash Content, weight percent | Thermal Conductivity, B.t.u./ft.² hr. (° F./ft.) | Resistivity, ohm-cm. at 25° C. | Surface Area, m.²/g. | Coeff. of Thermal Expansion, ×10⁷/° C. | Compressive Strength, p.s.i. |
|---|---|---|---|---|---|---|---|
| 0.084–0.090 | 1.430 | None | [1] 0.78 | [1] 0.32–0.38 | 4.4 | [1] 16.84 (25°–484° C.) | [1] 58 |
| 0.158–0.179 | 1.464 | None | [2] 0.92 | [1] 0.34 | 2.5 | [2] 37.00–41.12 (25°–484° C.) | [1] 275 |
| 0.357–0.450 | 1.468 | None | [2] 1.09 | [2] 0.41 | 3.3 |  | [2] 225 |

[1] Measured with grain or pores.  [2] Measured across grain or pores.

TABLE II.—PHYSICAL PROPERTIES OF NATURAL WOOD CHARCOALS

A. PYROLYZED AT ABOUT 900° C.

| Type of Wood | Bulk Density, g./cc. | Helium Real Density, g./cc. | Ash Content, Weight Percent | Thermal Conductivity, B.t.u./ft.²-hr. (° F./ft.) | Resistivity, ohm-cm. at 25° C. | Surface Area, m.²/g. | Coeff. of Thermal Expansion ×10⁷/° C. | Compressive Strength, p.s.i. |
|---|---|---|---|---|---|---|---|---|
| Balsa | 0.088 | 1.980 | 3.095 |  | [1] 0.508 | 317 |  | [1] 870 |
| Maple | 0.380 | 1.919 | 1.292 |  | [1] 0.206 | 318 |  | [1] 3,790 |
| Oak | 0.539 | 1.942 | 0.568 |  | [1] 0.180 | 338 |  | [1] 7,035 |

B. GRAPHITIZED AT ABOUT 2,900° C.

| Type of Wood | Bulk Density, g./cc. | Helium Real Density, g./cc. | Ash Content, Weight Percent | Thermal Conductivity, B.t.u./ft.²-hr. (° F./ft.) | Resistivity, ohm-cm. at 25° C. | Surface Area, m.²/g. | Coeff. of Thermal Expansion ×10⁷/° C. | Compressive Strength, p.s.i. |
|---|---|---|---|---|---|---|---|---|
| Balsa | 0.118 | 1.647 | None | [1] 2.26 | [1] 0.208 | 6.0 |  | [1] 940 |
| Maple | 0.429 | 1.545 | None | [1] 2.98 | [1] 0.188 | 6.3 |  | [1] 3,310 |
| Oak | 0.596 | 1.495 | None | [1] 2.92 | [1] 0.130 | 10.3 |  | [1] 6,765 |

[1] Measured with grain or pores.

A comparison of the physical properties enumerated in Tables I and II indicates that the synthetic foam of this invention has a thermal conductivity below about 2 B.t.u./ ft.² hr. (°F./ft.) and can be produced having a bulk density ranging from about 0.03 gram per cubic centimeter to about 0.45 gram per cubic centimeter.

The thermal conductivity of the carbonaceous materials listed in the foregoing tables was determined by attaching one end of an elongated sample of said materials having a uniform cross-sectional area to a heat sink and introducing a known amount of power at the other end of said sample. The remainder of the sample was thermally insulated from the surroundings during the determination, and the temperature gradient per unit length of said sample was then measured by means of a differential thermocouple. From these measurements the thermal conductivity of the material was computed by means of the following relationship:

$$K = P \cdot \frac{1}{A} \cdot \frac{1}{\Delta T/\Delta L}$$

where K represents thermal conductivity, P represents the power input, A represents the cross-sectional area of the sample, and $\Delta T/\Delta L$ represents the ratio of a temperature difference to a predetermined length of a sample over which the temperature difference was measured.

The synthetic carbon foam of the present invention is further characterized by a relatively lower ash content and also by a higher resistivity than a natural wood charcoal having about the same bulk density. The degree of anisotropy exhibited by the synthetic carbon foam in terms of resistivity was observed to be in a ratio of about 3:4 (with the grain or pores:across the grain or pores).

In addition, the synthetic carbon foam of the present invention is non-ignitable in air and as such is particularly desirable as an insulating material. Sample of carbon foam when held in the flame of a Bunsen burner became incandescent only in the area in the immediate vicinity of the flame; however, the incandescence soon disappeared when the samples were removed from the flame. A blast of air on the outer surfaces of the carbon foam samples upon their withdrawal from the flame immediately extinguished any lingering incandescence. In direct contrast thereto, combustion of natural charcoal materials was accelerated when such materials were subjected to a similar treatment.

It appears that this difference in physical characteristics can be attributed to the relatively lower ash and alkali content of the synthetic carbon foam as compared to the natural charcoal materials. The alkali metals catalyze oxidation, thus the synthetic carbon foams oxidize more slowly and to a lesser degree because of the low concentration of these metals in the carbon foam.

It has been found also that synthetic carbon foam having a very low alkali metal content, i.e., less than 0.1 weight percent, has moisture adsorption characteristics at least equivalent to those of the natural wood chars. Comparative data of moisture adsorption are given in Table III below. The data were obtained by predrying small blocks of synthetic carbon foam and natural wood char @ 225° C. and thereafter exposing the blocks to air at 25° C. and 50% relative humidity. The moisture pickup after varying times of exposure was determined gravimetrically.

TABLE III.—MOISTURE ADSORPTION CHARACTERISTICS OF CARBON FOAM

| Material | Density, g./cc. | Weight gain, grams of moisture/cc. of material |
|---|---|---|
| Synthetic carbon foam | .039 | .004 after 24 hrs. (saturated at 7 hrs). |
| Do | 0.14 | .015 after 24 hrs. |
| Do | 0.40 | .030 after 24 hrs. |
| Balsa char | 0.088 | .008 after 26 hrs. (saturated at 8 hrs). |
| Maple char | 0.37 | .019 after 26 hrs. |
| Oak char | 0.53 | .019 after 26 hrs. |

The carbon foam is produced by subjecting a rigid polyurethane foam of the polyester type to a specific heat treatment which comprises a curing step, an oxidizing step, and a pyrolyzing step. If a graphitic foam is desired as the final product, the carbon foam obtained after the pyrolyzing step is further subjected to a graphitizing treatment.

The curing step comprises maintaining the polyurethane foam at an elevated temperature below about 200° C. and in an oxygen-containing atmosphere for a sufficient time period to increase the degree of cross-linking of the polymers present in the foam. Moreover, unreacted constituents are eliminated from the foam at this time.

The curing time is dependent on the particular polyurethane foam employed, the curing temperature, the degree of cross-linking present in the foam prior to curing, etc. The curing time can range from about 2 hours to about 64 hours. A preferred curing time ranges from about 8 hours to about 24 hours at a curing temperature in the range from about 150° C., to about 200° C.

The oxidizing step comprises maintaining the foam at a temperature in the range from about 200° C. to about 255° C. and in an oxygen-containing atmosphere for a sufficient time period to bring about a weight loss of the foam of at least about 3.5 percent. During this step some oxidation of the foam structure is believed to take place.

It is important that the temperature is maintained within the aforesaid limits since otherwise the foam fuses, collapses, and becomes distorted. A preferred temperature range for the oxidation step is from about 220° C. to about 24° C. However, if carbon foam having a very high surface area is desired, the preferred temperature for the oxidation step is about 250° C. It has been found that surface areas of the order of 100 to 400 m.²/gram can be obtained by subjecting the polyester type polyurethane foam having a nominal density in the range from about 5 to about 20 lbs./cu. ft. to a temperature of about 250° C. for about 24 hours during the oxidation step.

Also, while a foam weight loss of about 3.5 weight percent is sufficient to yield a satisfactory final product, a weight loss in the range from about 5 weight percent to about 40 weight percent is preferred.

The pyrolyzing step comprises maintaining the foam which previously has been subjected to the aforedescribed curing and oxidizing steps at a temperature in the range from about 500° C. to about 1000° C. for sufficient time period to produce a homogeneous, porous matrix consisting substantially of carbon. The pyrolyzing step is carried out in an oxygen-free atmosphere, such as vacuum or inert gas atmosphere comprising nitrogen, argon, krypton, xenon, helium, and the like. The pyrolyzing temperature is dependent on the particular polyurethane foam employed, the degree of foam shrinkage desired, and the desired physical properties of the final product. A pyrolyzing temperature at which the foam is at incandesence, i.e. about 900° C., is preferred.

The graphitization heat treatment is carried out at a temperature above about 2200° C. and in an oxygen-free atmosphere. A graphitization temperature in the range from about 2800° C. to about 3000° C. is preferred. The temperature and the duration of the graphitization treatment is dependent on the degree of graphitization desired and also on the physical size of the carbon foam piece being graphitized. The time period at the aforesaid temperature can be as short as five minutes and as long as eight hours. In most instances a time period of about thirty minutes is sufficient for complete graphitization.

Rigid polyurethane foams suitable for use with the present invention are those of the polyester type. These foams can be prepared by reacting a polyester with an organic polyisocyanate.

Polyesters that are suitable reactants with the polyisocyanates are those having reactive hydrogen-containing terminal groups, preferably predominantly hydroxyl groups. The hydroxyl number of the polyester is in the range from about 100 to about 600. Preferably the hydroxyl number is above about 150. Most preferred polyesters for the purposes of the present invention are those having a hydroxyl number in the range from about 150 to about 500.

The hydroxyl number is a measure of and is proportional to the hydroxyl concentration per unit weight of polyester. The hydroxyl number is defined in terms of milligrams of KOH equivalent per gram of polyester and is determined by reacting acetic anhydride (in pyridine solution) at refluxing temperature with the hydroxyl groups of the polyester. The unreacted acetic anhydride and the acetic acid formed are then titrated with aqueous sodium hydroxide using phenolphthalein indicator.

Typical polyesters are propylene glycol, ethylene glycol, glycerol, reaction products of polyols such as aliphatic polyols, i.e., polyethylene glycols, polypropylene glycols, polybutylene glycols, polyoxyethyleneoxybutylene glycols, polyoxypolypropyleneoxybutylene glycols, 1,2,6 - hexanetriol, 1,1,1-trimethylolpropane, and the like, with a polycarboxylic acid such as oxalic acid, succinic acid, maleic acid, adipic acid, sebacic acid, isosebacic acid, phthalic acid, and the like. Other useful polyesters comprise homopolymers of lactones, notably epsilon-caprolactones, started with a reactive hydrogen-containing compound, such as those disclosed in U.S. Patent No. 2,914,556.

A variety of organic polyisocyanates may be employed for reaction with the above-described polyesters to provide suitable rigid urethane foams. Preferred isocyanates are polyisocyanates and polyisothiocyanates of the general formula:

$$(RNCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8 - diisocyanato - p - methane, xylylene diisocyanates, (OCNCH$_2$CH$_2$CH$_2$OCH$_2$)$_2$, 1 - methyl - 2,4 - diisocyanato-cyclohexane, polymethylene polyphenylisocyanate, phenylene diisocyanates, tolylene diisocyanates, chlorophenylene diisocyanates, diphenylmethane - 4,4' - diisocyanate, naphthalene - 1,5 - diisocyanate, triphenylmethane-4,4',4''-triisocyanate, xylene - α,α' - diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [(NCG)_x]_y$$

in which $x$ and $y$ are two or more, as well as compounds of the general formula:

$$M(NCG)_x$$

in which $x$ and $y$ are two or more, as well as compounds polyfunctional atom or group. Examples of this type include ethylphosphonic diisocyanate, C$_2$H$_5$P(O) (NCO)$_2$; phenylphosphonic diisocyanate, C$_6$H$_5$P(NCO)$_2$; compounds containing a ≡Si —NCG group, isocyanates derived from sulfonamides R(SO$_2$NCO)$_x$, and the like.

Also useful are polyisocyanates prepared by phosgenation of aniline/formaldehyde condensation products.

The preparation of rigid polyurethane foams of the polyester type can be carried out by the one-shot or semiprepolymer techniques, each of which are well known. In the semiprepolymer technique, the polyester reactant is partially extended with excess isocyanate to provide a reaction product containing a high percentage of free isocyanate groups (20 to 35%) which is foamed at a later stage by reaction with additional polyester, catalyst and a blowing agent. In the one-shot technique, all of the reactants are reacted simultaneously with the foaming operation.

The amount of isocyanate employed will depend upon the density of the foam and the amount of cross-linking desired. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about —40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2 fluoroethane, 1,1,2 trichloro-1,2,2-trifluoroethane, 1,1,1-trichloro-2,2,2-trifluoroethane, 2 - chloro - 1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed.

A further class of blowing agents includes thermally-unstable compounds which liberate gases upon heating, such as N,N'-dimethyl-N,N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas is used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethylamine, triethylamine, N-methylmorpholine, N-ethylmorpholine, N,N-dimethylbenzylamine, N,N-dimethylethanolamine, N,N,N', N'-tetramethyl-1,3-butanediamine, triethanolamine, 1,4-diazabicyclo[2.2.2]octane, 1,2,4-trimethylpiperazine, bis(dimethylaminomethyl)amine, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetylacetone, ethylacetoacetate, salicylaldehyde, cyclopentanone-2-carboxylate, acetylacetoneimine, bis-acetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as MoO$_2^{++}$, UO$_2^{++}$, and the like;

(f) Alcoholates and phenolates of various metals such as Ti(OR)$_4$, Sn(OR)$_4$, Sn(OR)$_2$, Al(OR)$_3$, and the like, wherein R is alkyl or aryl, and the reaction products of alcoholates with carboxylic acid, beta-diketones, and 2-(N,N-dialkylamino)-alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis (isopropoxide), dibutyltin - bis(2 - dimethylaminopentylate), dibutyltin dichloride, dioctyltin dichloride, and the like, (i) Tertiary amine oxides such as pyridine-N-oxide, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, from about 0.001 percent to about 5 percent, based on weight of the reaction mixture.

Small amounts, e.g., about 0.001% to 5.0% by weight of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Patents 2,834,748 and 2,917,480, can also be employed in making the foam. Another useful class of emulsifiers are the "non-hydrolyzable" polysiloxane-polyoxyalkylene block copolymers. This class of compounds differs from the abovementioned polysiloxane-polyoxyalkylene block copolymers in that the polysiloxane moiety is bonded to the polyoxyalkylene moiety through direct carbon-to-silicon bonds, rather than carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyalkylene polymer, to a temperature sufficient to cause the polysiloxane polymer and the salt to react to form the block copolymer. Other useful emulsifiers include such materials as polyethoxylated vegetable oils. Although the use of an emulsifier is desirable to influence the type of foam structure that is formed, the rigid polyurethane foam starting materials can be prepared without emulsifiers in some cases.

The present invention is illustrated by the following examples.

*Example I*

Rigid polyurethane foam of the polyester type and having a nominal density of 5 lbs./ft.³ was cut into bars measuring 1″ x 1″ x 3″. These bars were then heated in air for varying time periods at three temperature levels: 200° C., 225° C., and 255° C. Thereafter the heated bars were pyrolyzed at about 900° C. in the absence of oxygen. All bars were heated to the pyrolyzation temperature at a uniform rate of about 50° C./hr. Weight loss, volume decrease, and bulk density of the bars at various stages of the heat treatment were determined. These experimental results are compiled in Table IV.

TABLE IV.—WEIGHT AND VOLUME CHANGE AFTER HEAT TREATING-IN-AIR AND AFTER PYROLIZING IN THE ABSENCE OF AIR

| After Heating-in-Air | | | | | After Pyrolysis at 900° C | | | |
| --- | --- | --- | --- | --- | --- | --- | --- | --- |
| Heating Temperature, ° C. | Heating Time, hrs. | Wt. Loss, Percent | Vol. Decrease, Percent | Bulk Density, g./cc. | Wt. Loss, Percent | Vol. Decrease, Percent | Bulk Density, g./cc. | Final Structure |
| 200 | 4 | 1.9 | .7 | .075 | 76.5 | | | Melted. |
| 200 | 16 | 2.6 | 1.7 | .076 | 72.4 | | | Distorted. |
| 200 | 30 | 3.6 | 1.7 | .069 | 68.0 | 74.8 | .090 | Good. |
| 200 | 60 | 6.1 | 2.4 | .074 | 63.0 | 65.5 | .083 | Do. |
| 225 | 2 | 2.2 | .7 | .069 | 73.7 | | | Distorted. |
| 225 | 4 | 3.4 | 1.7 | .074 | 69.3 | | | Do. |
| 225 | 7.5 | 5.4 | 5.3 | .074 | 63.7 | 70.7 | .087 | Good. |
| 225 | 16 | 9.9 | 11.3 | .077 | 57.6 | 62.1 | .090 | Do. |
| 225 | 30 | 15.0 | 19.3 | .077 | 55.0 | 64.5 | .086 | Do. |
| 225 | 48 | 18.0 | 21.1 | .076 | 54.9 | 61.5 | .085 | Do. |
| 255 | 1 | 6.5 | 8.7 | .074 | 66.1 | 73.6 | .094 | Do. |
| 255 | 2 | 10.3 | 13.5 | .078 | 60.2 | 66.5 | .089 | Do. |
| 255 | 4 | 16.1 | 19.0 | .072 | 56.4 | 62.5 | .082 | Do. |
| 255 | 7.5 | 21.4 | 24.4 | .078 | 54.9 | 61.3 | .087 | Do. |
| 255 | 16 | 30.5 | 32.4 | .073 | 57.1 | 65.3 | .087 | Do. |
| 255 | 30 | 35.0 | 37.8 | .077 | 59.1 | 66.3 | .089 | Do. |
| 255 | 48 | 39.0 | 46.7 | .087 | 61.0 | 61.0 | .085 | Do. |

Notes.—Volume and weight change reported after pyrolysis includes change reported after heating-in-air.

It is noted that a heat treatment in air at about 200° C. for about 30 hours, resulting in a weight loss of about 3.6 percent, was required before the foam bars could be pyrolyzed to carbon foam without melting or distortion. At a heat treatment temperature of about 225° C. a heating time period of about 7½ hours or somewhat less was sufficient to avoid subsequent distortion upon pyrolysis, and at about 255° C. a heat treatment of about 1 hour duration was sufficient.

Also, with increasing heat treating periods at 255° C. the total weight loss after pyrolysis at 900° C. goes through a minimum and then increases at oxidizing periods, i.e., heating-in-air periods, longer than 7.5 hours. Such behavior appears to indicate that the oxidizing step not only tends to increase the cross-linking within the foam structure but also tends to increase the percentage of fixed carbon after pyrolysis. The fixed carbon yield after the above treatment was about 45 percent.

During a parallel experiment wherein similar urethane foam bars were heated at temperatures of about 260° C. and at time periods of up to 64 hours in the absence of air, it was found that the resulting foam fused and collapsed upon pyrolysis. The amount of fixed carbon obtained after pyrolysis in the latter instance was only about 25 percent.

Example II

Rigid polyurethane foam of the polyester type and having a nominal density of about 10 lbs./ft.$^3$ was treated in a manner analogous to Example I. Prior to the treatment the foam bars were cured for about 15 hours at 200° C. The experimental results after the oxidizing step and the pyrolysis step are compiled in Table V.

TABLE V.—WEIGHT AND VOLUME CHANGE AFTER HEAT TREATING-IN-AIR AND AFTER PYROLIZING IN THE ABSENCE OF AIR

| After Heat Treating-in-Air | | | | | After Pyrolysis at 900° C | | | |
| --- | --- | --- | --- | --- | --- | --- | --- | --- |
| Heating Temperature, ° C. | Heating Time, hrs. | Wt. Loss, Percent | Vol. Decrease, Percent | Bulk Density, g./cc. | Wt. Loss, Percent | Vol. Decrease, Percent | Bulk Density, g./cc. | Final Structure |
| 200 | 4  | 1.5  | 4.4  | .144 | 74.8 | Melted |       | Distorted. |
| 200 | 16 | 2.1  | 5.0  | .136 | 71.3 | 86.0   | .28   | Do. |
| 200 | 32 | 3.6  | 6.3  | .137 | 68.1 | 78.0   | .194  | Good. |
| 200 | 64 | 6.0  | 9.1  | .140 | 65.0 | 72.8   | .74   | Do. |
| 225 | 2  | 2.9  | 2.5  | .136 | 70.9 | 80.0   | .199  | Sl. distortion. |
| 225 | 4  | 3.9  | 3.5  | .139 | 68.7 | 76.4   | .186  | Good. |
| 225 | 8  | 6.2  | 10.0 | .146 | 65.9 | 71.4   | .159  | Do. |
| 225 | 16 | 9.5  | 13.2 | .146 | 62.7 | 68.1   | .163  | Do. |
| 225 | 24 | 12.6 | 14.8 | .163 | 61.6 | 67.5   | .188  | Do. |
| 225 | 48 | 17.0 | 21.1 | .151 | 60.1 | 68.0   | .179  | Do. |
| 225 | 64 | 23.5 | 28.5 | .151 | 59.3 | 67.3   | .176  | Do. |
| 255 | 2  | 12.8 | 14.1 | .149 | 63.6 | 68.5   | .170  | Do. |
| 255 | 4  | 20.1 | 23.0 | .147 | 60.4 | 65.7   | .164  | Do. |
| 255 | 8  | 27.0 | 28.9 | .140 | 60.6 | 67.1   | .163  | Do. |
| 255 | 16 | 33.5 | 39.8 | .152 | 62.3 | 69.5   | .170  | Do. |
| 255 | 24 | 36.9 | 42.1 | .147 | 63.4 | 69.8   | .163  | Do. |
| 255 | 64 | 46.7 | 52.2 | .160 | 68.5 | 72.1   | .162  | Do. |

Note.—Volume and weight change reported after pyrolysis includes change reported after heating-in-air.

Here again it is noted that a weight loss of at least about 3.5 percent is required in order to produce a rigid synthetic carbon foam. The somewhat denser urethane foams used in Example II have a fixed carbon yield of about 40 percent.

Example III

Carbon foam prepared by the hereinabove discussed methods was placed in an electric furnace and heated to about 2900° C. in an inert atmosphere. The carbon foam was maintained at this temperature for about thirty minutes.

The physical properties of the resulting graphite foam are given in Table I above.

The foregoing examples are intended for illustrative purposes only and are not to be construed as limiting. Other embodiments within the spirit and scope of the present invention will readily present themselves to one skilled in the art.

I claim:

1. A method for producing carbon foam which comprises maintaining a rigid polyester-type polyurethane foam for a predetermined time period sufficient to increase the degree of cross-linking of the polymers therein at an elevated temperature below about 200° C. and in an oxygen-containing atmosphere; thereafter maintaining said polyurethane foam in an oxygen-containing atmosphere at a temperature in the range from about 200° C. to about 255° C. until said polyurethane foam sustains a weight loss of at least about 3.5 percent; and maintaining the resulting foam at a temperature in the range from about 500° C. to about 1000° C. and in an oxygen-free atmosphere for a sufficient time period to produce a carbon foam.

2. A method for producing carbon foam which comprises heating in an oxygen-containing atmosphere a rigid polyester-type polyurethane foam to a temperature in the range from about 150° C. to about 200° C. and maintaining said polyurethane foam at a temperature within said range for a time period of about 8 to about 24 hours; thereafter maintaining said polyurethane foam in an oxygen-containing atmosphere at a temperature in the range from about 220° C. to about 240° C. until said polyurethane foam sustains a weight loss of about 5 to about 40 weight percent; and maintaining the resulting foam in an oxygen-free atmosphere at incandescence for a sufficient time period to produce a carbon foam.

3. A method for producing graphite foam which comprises maintaining a rigid polyester-type polyurethane foam for a predetermined time period at an elevated temperature below about 200° C. and in an oxygen-containing atmosphere; thereafter maintaining said polyurethane foam in an oxygen-containing atmosphere at a temperature in the range from about 200° C. to about 255° C. until said polyurethane foam sustains a weight loss of at least about 3.5 weight percent; pyrolyzing the resulting foam at a temperature in the range from about 500° C. to about 1000° C. in an oxygen-free atmosphere for a sufficient time period to produce a carbon foam; and maintaining said carbon foam in an oxygen-free atmosphere at a temperature above about 2200° C. for a sufficient time period to produce a graphite foam.

4. A method for producing graphite foam which comprises heating in an oxygen-containing atmosphere a rigid polyester-type polyurethane foam to a temperature in the range from about 150° C. to about 200° C. and maintaining said polyurethane foam at a temperature within said range for a time period of about 8 to about 24 hours; thereafter maintaining said polyurethane foam in an oxygen-containing atmosphere at a temperature in the range from about 220° C. to about 240° C. until said polyurethane foam sustains a weight loss of about 5 to about 40 weight percent; pyrolyzing the resulting foam in an oxygen-free atmosphere at incandescence for a sufficient time period to produce a carbon foam; and maintaining said carbon foam in an oxygen-free atmosphere at a temperature in the range from about 2800° C. to about 3000° C. for a sufficient time period to produce a graphite foam.

5. A synthetic carbon foam article characterized by a carbon atom arrangement in a lattice substantially similar to that of carbon atoms in a polyester-type polyurethane foam, a bulk density in the range from about 0.03 grams per cubic centimeter to about 0.45 grams per cubic centimeter, an ash content of less than about 0.5 percent by weight, and a thermal conductivity less than about 2 B.t.u./ft.$^2$ hr. (° F./ft.).

6. A graphite foam article characterized by a carbon atom arrangement in a lattice substantially similar to that of carbon atoms in a polyester-type polyurethane foam, a bulk density in the range from about 0.03 gram per cubic centimeter to about 0.45 gram per cubic centimeter, and a thermal conductivity less than about 1.1 B.t.u./ft.$^2$ hr. (° F./ft.).

References Cited by the Examiner

UNITED STATES PATENTS

| | | | |
|---|---|---|---|
| 1,137,373 | 4/1915 | Aylsworth | 23—209.2 X |
| 1,538,505 | 5/1925 | Atkinson | 23—209.2 |
| 2,697,028 | 12/1954 | Baker et al. | 23—209.1 |
| 3,112,181 | 11/1963 | Petersen et al. | 23—209.1 |
| 3,121,050 | 2/1964 | Ford | 23—209.4 X |

OSCAR R. VERTIZ, *Primary Examiner.*

MAURICE A. BRINDISI, E. J. MEROS,
*Assistant Examiners.*

UNITED STATES PATENT OFFICE
CERTIFICATE OF CORRECTION

Patent No. 3,302,999  Dated February 7, 1967

Inventor(s) Charles V. Mitchell

It is certified that error appears in the above-identified patent and that said Letters Patent are hereby corrected as shown below:

Column 5, line 61, delete "and y are two or more, as well as compounds" and insert --is two or more and M is a monofunctional or--.

Signed and Sealed this second Day of September 1975

[SEAL]

Attest:

RUTH C. MASON
Attesting Officer

C. MARSHALL DANN
Commissioner of Patents and Trademarks